(12) United States Patent
Konoshima

(10) Patent No.: US 8,737,814 B2
(45) Date of Patent: May 27, 2014

(54) MOVING IMAGE EDITING APPARATUS AND MOVING IMAGE EDITING METHOD

(75) Inventor: Makiko Konoshima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 106 days.

(21) Appl. No.: 12/837,648

(22) Filed: Jul. 16, 2010

(65) Prior Publication Data

US 2011/0019974 A1    Jan. 27, 2011

(30) Foreign Application Priority Data

Jul. 27, 2009    (JP) ................................. 2009-174190

(51) Int. Cl.
*H04N 5/761*    (2006.01)

(52) U.S. Cl.
USPC .......................................... 386/278; 386/282

(58) Field of Classification Search
None
See application file for complete search history.

(56) References Cited

U.S. PATENT DOCUMENTS

| | | | |
|---|---|---|---|
| 2007/0041441 A1* | 2/2007 | Koyabu et al. | 375/240.12 |
| 2008/0310725 A1* | 12/2008 | Kurata et al. | 382/190 |
| 2010/0034508 A1 | 2/2010 | Morimoto et al. | |

FOREIGN PATENT DOCUMENTS

| | | |
|---|---|---|
| JP | 8-280002 A | 10/1996 |
| JP | 9-139912 A | 5/1997 |
| JP | 2004-179913 A | 6/2004 |
| JP | 2006-166289 A | 6/2006 |
| JP | 2007-150994 | 6/2007 |
| JP | 2008-92492 | 4/2008 |

OTHER PUBLICATIONS

Japanese Office Action mailed Jun. 25, 2013 for corresponding Japanese Application No. 2009-174190, with Partial English-language Translation.

* cited by examiner

*Primary Examiner* — William C Vaughn, Jr.
*Assistant Examiner* — Eileen Adams
(74) *Attorney, Agent, or Firm* — Fujitsu Patent Center

(57) ABSTRACT

A moving image editing apparatus including: a storage unit configured to store a first moving image; a stack memory configured to, each time a reading request for reading range of a portion of the first moving image from the storage unit, or a writing request for replacement range of a portion of the first moving image with a second moving image is received from a terminal, store the request; and a sending processing unit configured to output, when the reading request is read from the stack memory, to the terminal, a moving image in which the overlapping range of the reading range with regard to the first moving image has been replaced with the second moving image when the second moving image with which a range overlapping a portion of the reading range specified by the reading request is to be replaced has been received.

17 Claims, 10 Drawing Sheets

US 8,737,814 B2

MOVING IMAGE EDITING APPARATUS AND MOVING IMAGE EDITING METHOD

CROSS-REFERENCE TO RELATED APPLICATIONS

This application is based upon and claims the benefit of priority of the prior Japanese Patent Application No. 2009-174190, filed on Jul. 27, 2009, the entire contents of which are incorporated herein by reference.

FIELD

The present invention relates to a moving image editing apparatus and a moving image editing method that edit moving images stored in advance.

BACKGROUND

In order to use, for example, a moving image as broadcast content, or a movie, moving image editing apparatuses for editing moving images have been used. In particular, in order to quickly edit moving images, it is preferable that a plurality of users be able to edit one moving image. Accordingly, a technology that enables a plurality of users to edit one moving image has been developed (see, for example, Japanese Unexamined Patent Application Publication No. 2007-150994).

In a video editing system, which is one of the technologies of the related art, a server device used to edit video content and a plurality of terminals are connected with one another via a network. Furthermore, a storage device in which video content to be edited is stored is connected to the server device. The server device reads editing video content from the storage device and creates difference information for an editing screen with respect to the video content. Then, the server device transmits the difference information to the terminals. The terminals create an editing screen on the basis of the difference information, and transmit the information of operation by the user to the server device. Furthermore, the server device edits the video content on the basis of the operation information.

Moving images are coded because, in general, the amount of data thereof is large. Moving images are coded in accordance with standards, such as ISO Moving Picture Experts Group phase 2 (MPEG-2), MPEG-4, MPEG-4 Advanced Video Coding (MPEG-4 AVC), or ITU-T H.264, for example. In such a case, a moving image is coded in units of groups of pictures (GOPs). Then, within a GOP, pictures other than a beginning I picture that is intra-coded are coded by referring to the other pictures. For this reason, if a coded moving image is edited by assuming a place that is not a boundary of GOPs as a boundary, a picture that cannot be reproduced occurs.

Therefore, a technology capable of dividing a file at any desired division point while conforming with a certain standard format has been proposed (see, for example, Japanese Unexamined Patent Application Publication No. 2008-92492). In a data processing device, which is an example of the related art, when a stream file is to be divided into a preceding chapter and a subsequent chapter, the preceding chapter is created by attaching padding data to the area at the end of the GOP including the division point in accordance with a length alignment constraint.

SUMMARY

According to an aspect of the invention, moving image editing apparatus including: a storage unit configured to store a first moving image; a stack memory configured to, each time a reading request for reading range of a portion of the first moving image from the storage unit, or a writing request for replacement range of a portion of the first moving image with a second moving image is received from a terminal, store the request; and a sending processing unit configured to output, when the reading request is read from the stack memory, to the terminal, a moving image in which the overlapping range of the reading range with regard to the first moving image has been replaced with the second moving image when the second moving image with which a range overlapping a portion of the reading range specified by the reading request is to be replaced has been received.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
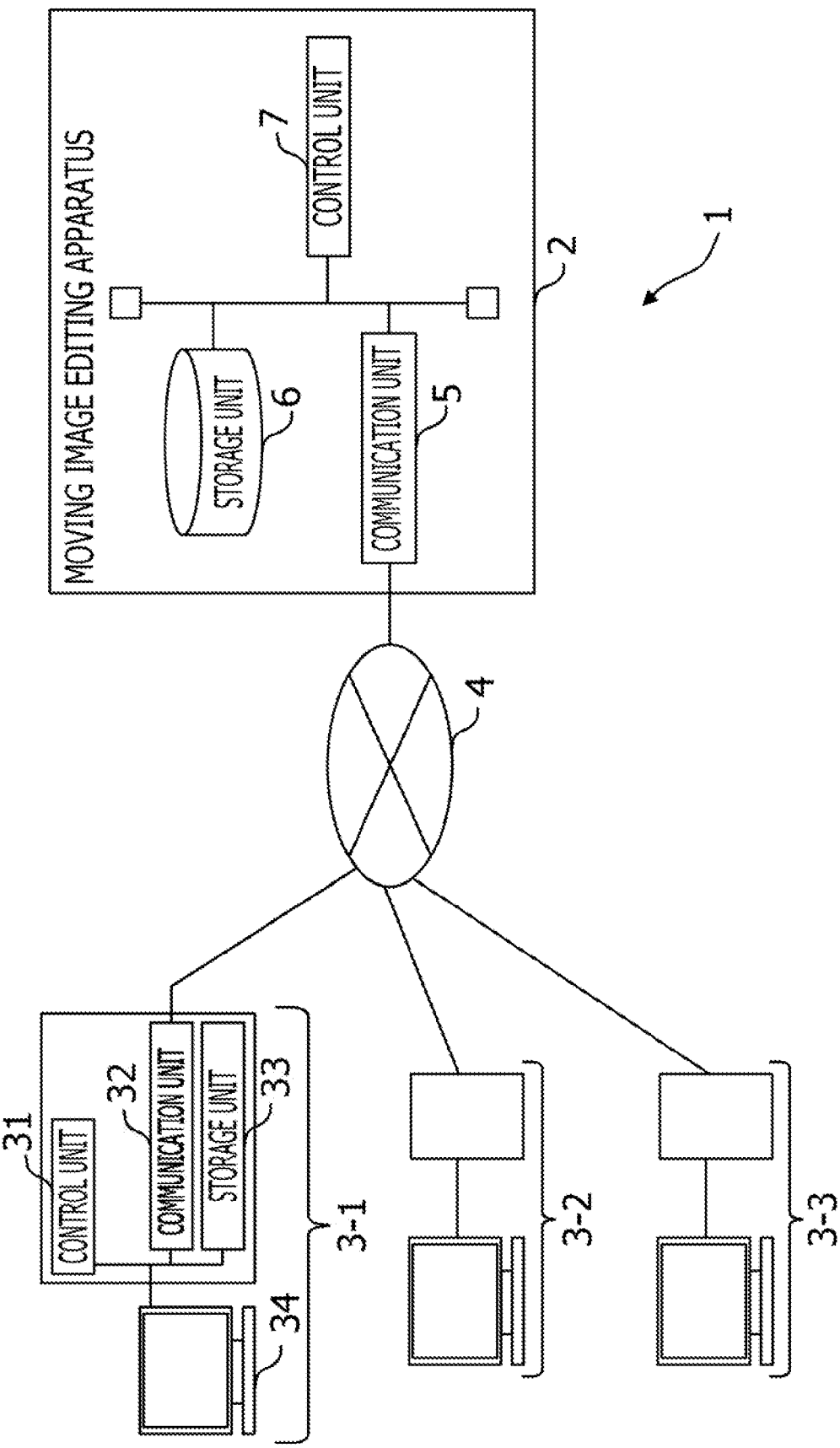
FIG. 1 is a schematic block diagram of a moving image editing system according to an embodiment.

First, some of the issues and/or problems addressed by examples of embodiments of the present invention are described below.

Allowing a plurality of users to edit one moving image at the same time reduces editing time and allows a moving image to be quickly edited. However, in the related art, until one person completes an editing operation on a certain moving image among the plurality of users, the other users cannot edit the moving image. For this reason, when a moving image is edited for a long period of time by one user, it is necessary for the other users to wait for a long period of time, and the editing efficiency is deteriorated.

Furthermore, in order to inhibit and/or prevent a plurality of users from performing different corrections at the same time on the same range of one moving image, changed portions of the moving image performed by someone among the plurality of users performing editing may be shared among the plurality of users. However, in the related art, since editing one moving image at the same time by a plurality of users has not been considered in the manner described above, the content that is being edited cannot be shared among the plurality of users.

Accordingly, an object of the present invention is to provide a moving image editing apparatus and a moving image editing method in which editing of one moving image by a plurality of users at the same time is possible and sharing a moving image edited by someone among the plurality of users with the other users is possible.

A description will be given below of a moving image editing apparatus according to one embodiment with reference to the drawings.

This moving image editing apparatus is connected to at least one user terminal via a communication network, and a moving image stored by the moving image editing apparatus is corrected at each user terminal. Then, the moving image editing apparatus replaces at least a portion of the original moving image with the moving image corrected at the user terminal. In the case of replacing the moving image, when this moving image editing apparatus sends a moving image of a certain range to a user terminal in accordance with a request from the user terminal, the moving image editing apparatus confirms whether or not a corrected moving image with regard to the moving image of the certain range has been received from any of the user terminals. Then, if there is a corrected moving image, the moving image editing apparatus sends the moving image created by combining the corrected moving image with the original moving image, thereby making it possible for a plurality of users to edit one moving image at substantially the same time and/or the same time. Stated differently, a plurality of users can edit one moving image in parallel with each other.

Furthermore, if there is a difference in the image quality of a picture between the edited portion in the moving image and the unedited portion before and after that, a viewer may not be satisfied with the moving image after editing. However, in the related art, no consideration is paid to a difference in the image quality between the edited portion and the unedited portion before and after editing. Thus, the user himself/herself may need to edit the moving image so that the difference in the image quality is reduced and/or eliminated.

Furthermore, when a coded moving image is transmitted to a decoding device, it is necessary for the decoding device to be capable of decoding the coded moving image. Here, it is assumed that the decoding device has a buffer having a certain capacity for temporarily storing a coded moving image. In this case, the coding device that codes a moving image is requested to code the moving image in such a manner that the amount of data stored in the buffer falls within a certain range of capacity. In the following, a virtual buffer possessed by this decoding device is referred to as a virtual buffer. For example, in MPEG, a way of thinking regarding the change of the amount occupied by the coded moving image in the virtual buffer is defined as a Video Buffering Verifier (VBV). In VBV, a model is adopted in which, after a coded moving image is stored in a virtual buffer for the amount of initial delay at a maximum transmission bit rate, data for one picture is instantly extracted from the virtual buffer at an interval of fixed time. Then, when a moving image is to be coded at a fixed bit rate, the occupied amount that the coded moving image transmitted to the virtual buffer occupies in the virtual buffer should be between the upper limit value and the lower limit value of the virtual buffer.

However, in the related art, even if the moving image has been coded so as to satisfy the VBV definition regarding edited portions, it is not guaranteed that the entire moving image after editing satisfies the VBV definition. Thus, there is a risk that a decoding device cannot reproduce a moving image after editing.

Therefore, the moving image editing apparatus replaces a portion of the original moving image with a moving image corrected at a user terminal only when image continuity is maintained at other than a position at which a scene changes, for example, and the moving image after editing satisfies the VBV definition in the moving image after editing.

A picture included in a moving image to be edited may be any one of a field obtained by an interlace method and a frame obtained by a progressive method. It is assumed in the following embodiment that a moving image to be edited has been stored in a coded form in a moving image editing apparatus. Furthermore, a moving image may have been coded in accordance with any encoding standard. The coded moving image may have been coded in accordance with, for example, a standard, such as MPEG-2, MPEG-4, MPEG-4 AVC, or H.264, for example. However, a moving image to be edited may not have been coded.

FIG. 1 is a schematic block diagram of a moving image editing system 1 including a moving image editing apparatus 2 according to an embodiment. The moving image editing system 1 includes the moving image editing apparatus 2, and three user terminals 3-1 to 3-3. The moving image editing apparatus 2 is connected to the user terminals 3-1 to 3-3 in such a manner as to be communicable with one another via a communication network 4 through which data is transmitted in accordance with a communication standard, such as an Internet protocol (IP), for example. In FIG. 1, in order to facilitate understanding, only the three user terminals are illustrated. However, the number of user terminals possessed by the moving image editing system 1 is not limited to three. The moving image editing system 1 is able to have any number of one or more user terminals.

Each of the user terminals 3-1 to 3-3 edits (e.g., corrects, modifies, etc.) a coded moving image received from the moving image editing apparatus 2 in accordance with the operation of a user. For this purpose, each of the user terminals 3-1 to 3-3 includes a control unit 31, a communication unit 32, a storage unit 33, and a display unit 34.

The control unit 31 includes at least one processor, a memory circuit, and a peripheral circuit. Then, the control unit 31 decodes a moving image from a data stream received from the moving image editing apparatus 2 via the communication network 4 and the communication unit 32, and stores the moving image in the storage unit 33 (e.g., memory). Furthermore, the control unit 31 executes an editing program for correcting a picture included in the moving image or for replacing a picture with another picture. Then, the control unit 31 displays the moving image stored in the storage unit 33 on the display unit 34 in accordance with the editing program. As a result, it is possible for the user to edit the moving image by operating an operation unit (not shown), such as a mouse and a keyboard, for example, in accordance with an editing program while referring to the displayed moving image.

Furthermore, the control unit 31 codes the edited moving image in accordance with an encoding method that may be the same as the encoding method used to code the original moving image, thereby creating an editing data stream. For example the control unit 31 codes the edited moving image with the same encoding method used to code the original moving image. The control unit 31 sends the editing data stream to the moving image editing apparatus 2 via the communication network 4.

Furthermore, the control unit 31 sends, to the moving image editing apparatus 2, a request for reading a data stream to be edited or for writing a data stream to be edited via the communication unit 32 and the communication network 4.

There are five types of requests described below as example requests transmitted from the user terminals 3-1 to 3-3 to the moving image editing apparatus 2.

(a) Reading Request

A reading request is used to request the moving image editing apparatus 2 to transmit at least a portion of a data stream of a moving image saved in the moving image editing apparatus 2 to a user terminal. The reading request includes information indicating the identification number of the request, the identification number of the user terminal that transmits a request, and the identification number and the range of a data stream to be read.

The identification number of the request is set in such a manner that a user terminal that sends a request becomes a unique number for each request transmitted by the user terminal. Furthermore, the identification number of the user terminal is recommended to be a number that is capable of uniquely identifying a user terminal of the moving image editing system 1. A number that is uniquely identifies a user terminal may be, for example, an IP address assigned to each of the user terminals 3-1 to 3-3. Furthermore, the identification number of the data stream to be read is a number associated with the data stream of each moving image saved in the moving image editing apparatus 2. For example, the identification number of the data stream may be saved in the image editing apparatus 2 in advance. The user terminals 3-1 to 3-3 may access the moving image editing apparatus 2, for example, when the editing program is started, and may obtain the identification numbers of the data streams of all the moving images saved in the moving image editing apparatus 2. Furthermore, the range of the data stream of the moving image is specified by an elapsed time from when a data stream to be read from the beginning of the moving image is started until a completion time. Alternatively, the range of the data stream of the moving image may be specified by a time period elapsed until the data stream to be read from the beginning of the moving image is started, and by the time length of the data stream to be read.

(b) Writing Request

A writing request is used to request that the moving image editing apparatus 2 replace the data stream of the moving image saved in the moving image editing apparatus 2 with the editing data stream of the data stream of the moving image created at the user terminal. The writing request includes information indicating the identification number of the request, the identification number of the user terminal that transmits a request, and the identification number and the range of the data stream of the moving image to be replaced. Furthermore, the editing data stream, together with the writing request, is transmitted to the moving image editing apparatus 2.

(c) Editing Request

An editing request is used to read at least a portion of the data stream from the moving image editing apparatus 2 and to request the moving image editing apparatus 2 to replace the read portion with the editing data stream created at the user terminal. Therefore, the editing request includes a reading request and a writing request as one set. For this reason, when the moving image editing apparatus 2 executes an editing request, the moving image editing apparatus 2 transmits, to the user terminal that has made the request, the data of the picture included in the range, in which the data stream is specified, which is specified in accordance with the reading request included in the editing request. After that, the moving image editing apparatus 2 waits until an editing data stream is received from the user terminal that transmitted the editing request. Then, after the moving image editing apparatus 2 receives the editing data stream, the moving image editing apparatus 2 executes the writing request included in the editing request.

(d) Writing Completion Request

A writing completion request is used to request that the moving image editing apparatus 2 replace a portion included in the specified range of the data stream of the specified moving image with the editing data stream transmitted together with the writing request or the editing request. The writing completion request includes the identification number of the user terminal that transmitted the request, and the identification number of the writing request or the editing request corresponding to the editing data stream used for replacement. Furthermore, the writing completion request may specify that a range narrower than the range specified by the corresponding writing request or editing request is replaced. In this case, the writing completion request includes information indicating the range of the data stream to be replaced.

(e) Cancellation Request

A cancellation request is used to request the moving image editing apparatus 2 to cancel a request that has already been transmitted to the moving image editing apparatus 2 and that has not yet been performed. The cancellation request includes the identification number of the user terminal that transmitted the request and the identification number of the request to be cancelled.

In each of the above-mentioned requests, the range of the data stream to be replaced may be specified in units of pictures or may be specified in units of GOPs, for example.

The communication unit 32 includes an interface circuit that connects a user terminal to the communication network 4. The communication unit 32 receives a data stream of a moving image to be corrected from the moving image editing apparatus 2 via the communication network 4. Then, the communication unit 32 passes the received data stream to the control unit 31. Furthermore, the communication unit 32 sends various kinds of requests for the moving image editing apparatus 2, or the editing data stream, which have been received from the control unit 31, to the communication network 4.

The storage unit 33 has, for example, at least one of a semiconductor memory, a magnetic disk device, and an optical disc device. Then, the storage unit 33, under the control unit 31, receives a coded data stream from the moving image editing apparatus 2, and stores the moving image after decoding. Furthermore, the storage unit 33 stores a moving image corrected by the user. Furthermore, the storage unit 33 stores various kinds of programs executed by the control unit 31, such as an editing program, or data, for example.

The display unit 34 includes, for example, a liquid-crystal display panel. Then, the display unit 34 displays the moving image received from the control unit 31, an operation guide message that is prepared in accordance with the editing program, or various kinds of icons for operation.

The moving image editing apparatus 2 saves at least one moving image as a coded data stream. Then, the moving image editing apparatus 2 sends the data stream to the user terminal that made the request via the communication network 4 in response to the request from one of the user terminals 3-1 to 3-3. Alternatively, the moving image editing apparatus 2 updates the data stream of the specified moving image with the editing data stream received from one of the user terminals 3-1 to 3-3. For this purpose, the moving image editing apparatus 2 includes a storage unit 6 and a control unit 7.

The communication unit 5 has an interface circuit for connecting the moving image editing apparatus 2 to the communication network 4. Then, the communication unit 5 sends the data stream received from the control unit 7. Alternatively, the communication unit 5 receives an editing data stream or various kinds of requests from one of the user terminals 3-1 to 3-3 via the communication network 4. Then, the communication unit 5 passes the received correction data stream or various kinds of requests to the control unit 7.

The storage unit 6 includes, for example, at least one of a semiconductor memory, a magnetic disk device, and an optical disc device. Then, the storage unit 6 saves at least one moving image as a coded data stream. Furthermore, in the data stream of each moving image, an identification number for identifying the data stream is set. The storage unit 6 stores the corresponding identification number together with the data stream of each moving image.

Furthermore, the storage unit 6 saves the editing data stream received from one of the user terminals 3-1 to 3-3. Furthermore, the storage unit 6 stores various kinds of programs or data used by the moving image editing apparatus 2.

The control unit 7 includes at least one processor, a memory circuit, and a peripheral circuit. Then, the control unit 7 reads a data stream included contained in the range specified by the request from one of the user terminals 3-1 to 3-3 among the data streams stored in the storage unit 6. Then, the control unit 7 sends the read data stream to the user terminal that made the request via the communication network 4. Alternatively, the control unit 7 updates the data stream of the moving image specified by the request with the editing data stream received from one of the user terminals 3-1 to 3-3.

Figure 2:
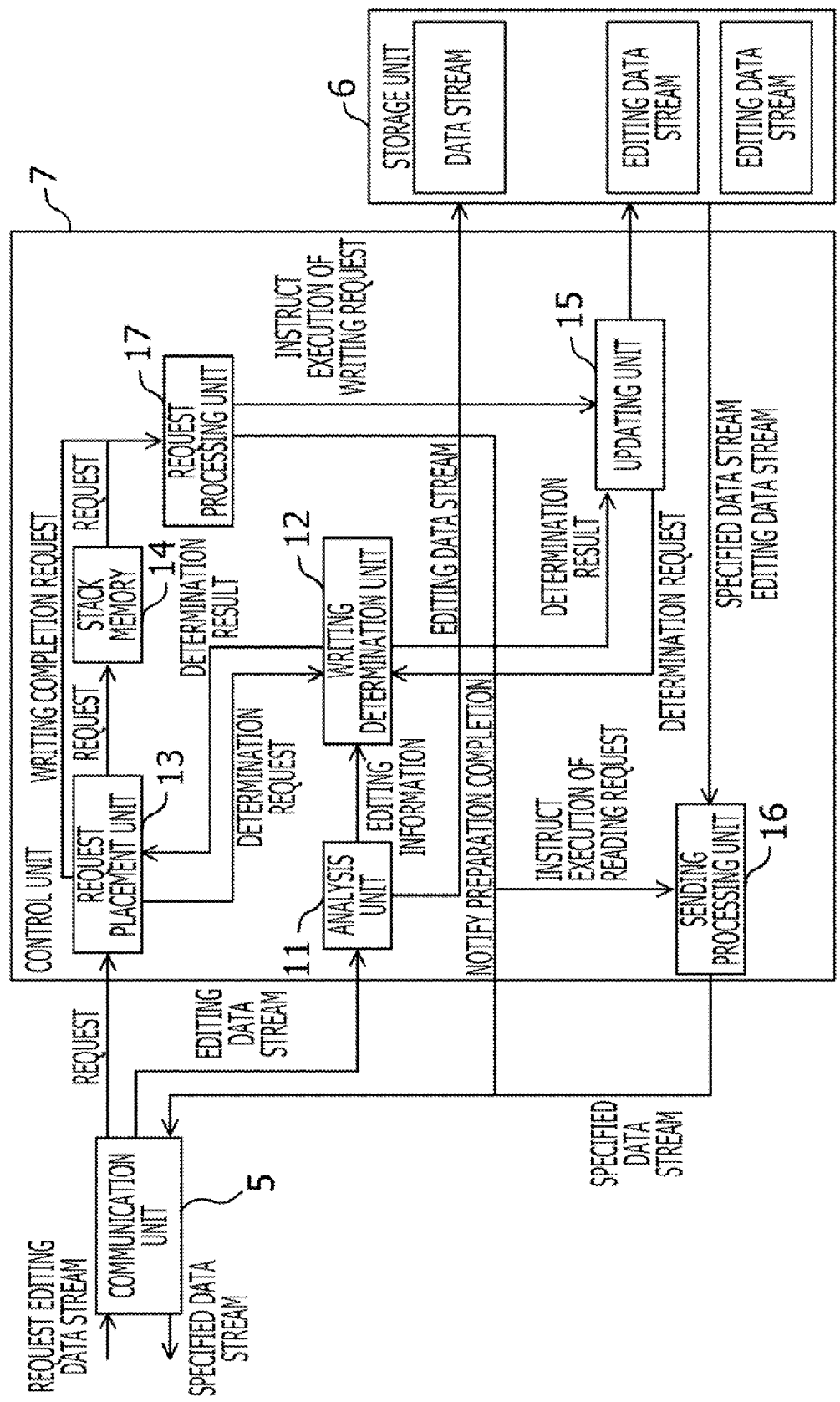
FIG. 2 is a functional block diagram of a control unit of a moving image editing apparatus.

FIG. 2 is a functional block diagram of the control unit 7 of the moving image editing apparatus 2. The control unit 7 includes an analysis unit 11, a writing determination unit 12, a request placement unit 13, a stack memory 14, an updating unit 15, a sending processing unit 16, and a request processing unit 17.

These units possessed by the control unit 7 are, for example, function modules implemented by a computer program executed by the processor included in the control unit 7. Alternatively, these units of the control unit 7 may be separate electronic circuits. Alternatively, these units of the control unit 7 may be integrated circuits in which circuits having the functions of these units are integrated.

The analysis unit 11 analyzes the editing data stream received together with the writing request or the editing request. Then, the analysis unit 11 extracts editing information for determining whether or not the editing data stream may be used to replace the data stream of the specified moving image.

For example, the analysis unit 11 extracts the position of an I picture included in the editing data stream, and the amount of information of each coded picture. The position of the I picture is obtained by checking the area in which the picture type is stored from the header information determined by the encoding method for the editing data stream. Furthermore, the amount of information of each coded picture is obtained by checking the size of the area, in which each coded picture is stored, in accordance with the encoding method of the editing data stream.

The analysis unit 11 passes the editing information to the writing determination unit 12. Furthermore, the analysis unit 11 stores the editing data stream whose analysis has been completed in the storage unit 6.

When the writing determination unit 12 receives the writing request or the editing request, the writing determination unit 12 determines whether or not the editing data stream received together with the request can be used to replace the data stream of the specified moving image. Furthermore, when the writing determination unit 12 receives the writing completion request, the writing determination unit 12 determines whether or not the editing data stream corresponding to the writing completion request can be used to replace the data stream of the specified moving image.

As an example, when the VBV definition is satisfied even if a portion of the moving image data stream specified by the writing request or the editing request is replaced with the editing data stream, the writing determination unit 12 determines that the editing data stream can be used. As a result, the moving image editing apparatus 2 reduces the likelihood of and/or prevents the data stream after a portion of the specified moving image data stream is replaced with the editing data stream from becoming unreproducible.

Therefore, the writing determination unit 12 obtains the amount of information of each picture included in the data stream of the specified moving image. Furthermore, the writing determination unit 12 refers to the editing information received from the analysis unit 11, and the range of the replacement of the editing data stream received from the request placement unit 13 or the updating unit 15. Then, the writing determination unit 12 calculates, in accordance with the VBV definition, the change in the occupied amount that the data stream in which the specified range of the specified moving image data stream has been replaced with the editing data stream occupies in the virtual buffer. Then, the writing determination unit 12 determines that, if the occupied amount is within the permissible range of the virtual buffer, the editing data stream can be used.

When the data stream of the specified moving image is transferred at a fixed bit rate, the permissible range of the virtual buffer is a range from the lower limit value of the virtual buffer to the upper limit value thereof. Therefore, the writing determination unit 12 determines whether or not the occupied amount in the virtual buffer at the time of the completion of the storage of each picture of the data stream after replacement in the virtual buffer and at the time of the completion of the reading falls within the range between the lower limit of the virtual buffer and the upper limit thereof. Then, with regard to all the pictures of the data stream after replacement, when the occupied amount in the virtual buffer falls within the range between the lower limit value and the upper limit value of the virtual buffer, the writing determination unit 12 determines that the VBV definition is satisfied. On the other hand, with regard to any one of the data streams after replacement, when the occupied amount in the virtual buffer becomes less than the lower limit value of the virtual buffer or higher than the upper limit value thereof, the writing determination unit 12 determines that the VBV definition is not satisfied.

When the specified moving image data is transferred at a variable bit rate, the permissible range of the virtual buffer becomes greater than the lower limit value of the virtual buffer. Accordingly, the writing determination unit 12 determines whether or not the occupied amount in the virtual buffer is greater than the lower limit of the virtual buffer with respect to each picture of the data stream after replacement. Then, with respect to all the pictures of the data stream after replacement, when the occupied amount in the virtual buffer is greater than the lower limit value of the virtual buffer, the writing determination unit 12 determines that the VBV definition is satisfied. On the other hand, with respect to any one of the pictures of the data stream after replacement, when the occupied amount in the virtual buffer is less than the lower limit value of the virtual buffer, the writing determination unit 12 determines that the VBV definition is not satisfied.

Figure 3A:
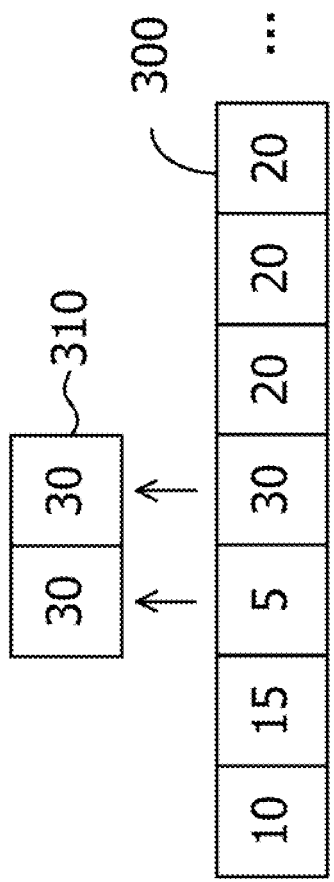
FIG. 3A illustrates an example of the amount of information of each picture included in a coded moving image.
Figure 3B:
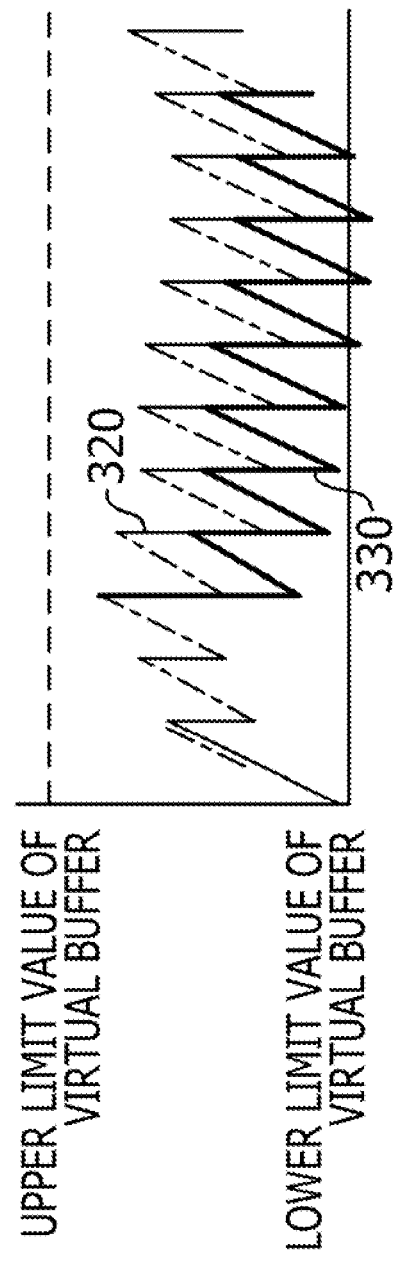
FIG. 3B illustrates an example of the change of the occupied amount of a virtual buffer by the data stream of the coded moving image shown in FIG. 3A.

FIG. 3A illustrates an example of the amount of information of each picture included in a coded moving image. FIG. 3B illustrates an example of the change in the occupied amount of the data stream of the moving image shown in FIG. 3A in the virtual buffer. In FIG. 3A, a block sequence 300 represents the amount of information for each picture of the original data stream. Furthermore, a block sequence 310 represents the amount of information of each picture included in the editing data stream for replacing a portion of the original data stream. In FIG. 3B, the horizontal axis represents time, and the vertical axis represents the occupied amount of a virtual buffer. A graph 320 represents a change in the occupied amount that the original data stream occupies in the virtual buffer. A graph 330 represents a change in the occupied amount that a data stream in which a portion of the original data stream has been replaced with an editing data stream corresponding to the block sequence 310 occupies in the virtual buffer.

As illustrated in the graph 320, the occupied amount that the original data stream occupies in the virtual buffer is always between the lower limit value and the upper limit value of the virtual buffer. However, as a result of the third and fourth pictures within the original data stream being replaced with the editing data stream, the amount of information of the third picture becomes larger than the original amount of information. In this case, as illustrated in the graph 330, the amount of information read from the virtual buffer with respect to the third picture becomes larger by an amount corresponding to an increase in the amount of information of the third picture. For this reason, the occupied amount that the data stream replaced in and subsequent to the third picture occupies in the virtual buffer is decreased. Then, in this example, with regard to the sixth and subsequent pictures, the occupied amount that the replaced data stream occupies in the virtual buffer becomes lower than the lower limit value of the virtual buffer. That is, the replaced data stream violates the VBV definition.

In such a case, the writing determination unit 12 determines that the editing data stream should not or cannot be used.

The moving image editing apparatus 2 may obtain in advance the occupied amount in the virtual buffer at the time when the storage of the data of each picture included in the moving image is completed or at the time when the data of each picture is read, and may store the occupied amount in advance in the storage unit 6 together with the data stream of the moving image. In this case, when it is determined whether or not the VBV definition is satisfied, the writing determination unit 12 reads, from the storage unit 6, the occupied amount that each picture of the data stream of the specified moving image occupies in the virtual buffer, and uses the occupied amount. Then, the writing determination unit 12 obtains the total of the differences between the amount of information of each picture included in the editing data stream, and the amount of information of the corresponding picture, which is included in the portion replaced with the editing data stream. Furthermore, the writing determination unit 12 obtains the maximum value and the minimum value of the occupied amount of the portion replaced with the editing data stream and of each picture at and subsequent to that portion. Then, if the value such that the total of the above-mentioned differences is added to the maximum value of the occupied amount is greater than or equal to the upper limit of the virtual buffer, the writing determination unit 12 determines that the VBV definition is not satisfied for the data stream after replacement. In a similar manner, if the value such that the total of the above-mentioned differences is added to the minimum value of the occupied amount is less than the lower limit of the virtual buffer, the writing determination unit 12 determines that the VBV definition is not satisfied for the data stream after replacement.

As described above, by obtaining in advance the occupied amount that each picture included in the data stream of the moving image occupies in the virtual buffer, the writing determination unit 12 does not need to calculate the change in the occupied amount that all the pictures of the data stream after replacement occupy in the virtual buffer. For this reason, it is possible for the writing determination unit 12 to decrease the number of computations required for determining whether or not the editing data stream can be used to replace the data stream of the specified moving image.

As another example, the writing determination unit 12 checks image continuity in the boundary of the range replaced with the editing data stream in the data stream of the specified moving image. When the image continuity in the boundary is maintained, the writing determination unit 12 determines that the editing data stream can be used to replace the data stream of the specified moving image. In the present embodiment, when there is a difference in image quality to such a degree that the viewer is likely not aware of the difference. For example, in terms of color and degree of approximations of pixel values, among a plurality of pictures that are reproduced continuously with respect to time, the writing determination unit 12 determines that the image continuity is maintained appropriately. As a result, it is possible for the moving image editing apparatus 2 to reduce the likelihood and/or prevent the viewer from not being satisfied with a moving image whose data stream is being reproduced, in which the specified range of the data stream of the specified moving image has been replaced with the editing data stream.

However, when the boundary of the range that is to be replaced with the editing data stream is a position at which a scene changes, the writing determination unit 12 may determine that the editing data stream can be used even if the image continuity is not satisfied. The reason for this is that the possibility of the image quality of the picture being changed is high before and after the position at which a scene changes.

Accordingly, the writing determination unit 12 obtains, as the feature quantity for checking image continuity, for example, an averaged quantization width of each picture, an averaged quantization parameter, or an amount of coded information. The averaged quantization width is an average value of quantization widths that are quantized with respect to each of macroblocks, which is a unit at which quantization is performed, which are included in the coded picture. The averaged quantization parameter is an average value of quantization parameters that are used to determine a quantization width for each of the macroblocks, which is a unit at which quantization is performed, which are contained in the coded picture. For a method of calculating a quantization parameter, refer to, for example, a URL identified by http://www.mpeg.org/MPEG/MSSG/tm5/Ch10/Ch10.html.

When the absolute value of the difference between feature quantities between two pictures with the boundary of the range replaced with the editing data stream therebetween is greater than or equal to a certain threshold value, the writing determination unit 12 determines that the boundary is a position at which a scene changes.

The certain threshold value is set experimentally or empirically in such a manner as to become the minimum value of the absolute value of the difference in the feature quantities when a scene changes. Furthermore, when encoding methods for two pictures with a boundary therebetween are different, the possibility is high that the absolute value of the difference in the feature quantities is greater than in the case in which the encoding methods for two pictures with the boundary therebetween are equal. For example, if one of two pictures with a boundary therebetween is an I picture, which is intra-coded, and the other is a P picture or a B picture, which is inter-coded, the amount of the coded information of the I picture is larger than the amount of the coded information of the B picture. Accordingly, a certain threshold value in a case where the encoding methods for two pictures with a boundary therebetween are different may be set to a value greater than that in a case where the encoding methods for two pictures with a boundary therebetween are the same.

Alternatively, when the amount of coded information of any of pictures becomes greater than a certain threshold value, the writing determination unit 12 may determine that the position of the picture corresponds to a position at which a scene changes. In this case, also, the certain threshold value is set experimentally or empirically. Furthermore, the certain threshold value may be set to a different value in accordance with the encoding method of the picture to be considered. For example, the certain threshold value be set to be highest for an I picture that is intra-coded, be set to be next highest for a P picture, and be set to be lowest for a B picture that is predictive-coded in one direction.

Alternatively, in order to determine whether or not the boundary is a position at which a scene changes, the writing determination unit 12 may obtain the total of the difference absolute values of each color value between pixels at mutually corresponding positions in two pictures with a boundary of a range replaced with an editing data stream therebetween. Also, in this case, when the total of the difference absolute values of each color value between pixels is greater than or equal to the certain threshold value, the writing determination unit 12 determines that the boundary is a position at which a scene changes. The certain threshold value is set experimentally or empirically so as to become a minimum value of the total of the difference absolute values of color values between pixels at the position at which a scene changes. Furthermore, in order to obtain the total of the difference absolute values of each color value between pixels at mutually corresponding positions, the writing determination unit 12 decodes the data stream of the specified moving image.

When the boundary of the range replaced with the editing data stream within the data stream of the specified moving image is a position at which a scene changes, the writing determination unit 12 determines that the editing data stream can be used.

On the other hand, when the boundary of the range replaced with the editing data stream within the data stream of the specified moving image is not a position at which a scene changes, the writing determination unit 12 checks the image continuity at the boundary.

More specifically, the writing determination unit 12 checks image continuity between a picture positioned at the beginning or the end of the editing data stream and a picture adjacent to the boundary of the range replaced with the editing data stream of the data stream. For example, the writing determination unit 12 obtains an absolute value of one of the differences in the feature quantities, such as an averaged quantization width, an averaged quantization parameter, and the amount of information between two pictures, for example. Then, if the absolute value of the difference in the feature quantities is less than a continuous threshold value with respect to both the beginning and the end of the editing data stream, the writing determination unit 12 determines that the image continuity is maintained. On the other hand, if the feature quantity is greater than or equal to the continuous threshold value, the writing determination unit 12 determines that the image continuity is not maintained. The continuous threshold value is a value corresponding to the maximum value of the absolute value of the difference in the feature quantities, such that the viewer is substantially unaware of the difference in the image quality, such as in terms of color and degree of approximations of the pixel values, among a plurality of pictures reproduced continuously with respect to time, and is determined experimentally or empirically.

Furthermore, if the total of the difference absolute values of each color value between pixels is less than a certain continuous threshold value between the two pictures, the writing determination unit 12 may determine that the image continuity is maintained.

The writing determination unit 12 checks the VBV definition and image continuity. Then, when the VBV definition is not satisfied or the image continuity is not maintained, the writing determination unit 12 determines that the editing data stream should not or cannot be used to replace the data stream of the specified moving image. On the other hand, if the VBV definition is satisfied and the image continuity is maintained, the writing determination unit 12 determines that the editing data stream can be used to replace the data stream of the specified moving image. Then, the writing determination unit 12 notifies the request placement unit 13 or the updating unit 15 of the determination result of whether or not the editing data stream can be used to replace the data stream of the specified moving image. Furthermore, when it is determined that the editing data stream should not or cannot be used to replace the data stream of the specified moving image, the writing determination unit 12 also notifies the request placement unit 13 or the updating unit 15 of the reason for the determination result. The reason for the determination result that the editing data stream should not or cannot be used is that, for example, the VBV definition is not satisfied or the image continuity is not maintained.

Furthermore, in order to determine whether or not the editing data stream can be used to replace the data stream of the specified moving image, the writing determination unit 12 may check only one of the VBV definition and the image continuity, for example.

The request placement unit 13 registers, in the stack memory 14, the reading request, the writing request, or the editing request received by the moving image editing apparatus 2 from one of the user terminals 3-1 to 3-3 in the order of reception time. For example, the request placement unit 13 refers to the identification number and the range of the data stream of the specified moving image, which are included in the received request, and identifies the GOP of the data stream serving as a target on the basis of the identification number and the range. Then, the request placement unit 13 associates the identified GOP with the information included in the request.

However, when the received request is a writing request, the request placement unit 13 notifies the writing determination unit 12 of the identification number and the range of the data stream of the specified moving image, which are included in the request. The request placement unit 13 registers the request when a determination result indicating that the editing data stream received together with the writing request can be used to replace the data stream of the specified moving image is received from the writing determination unit 12. According to one embodiment, the request placement unit 13 registers the request only when a determination result indicating that the editing data stream received together with the writing request can be used to replace the data stream of the specified moving image is received from the writing determination unit 12. When a determination result indicating that the editing data stream received together with the writing request should not or cannot be used to replace the data stream of the specified moving image is received from the writing determination unit 12, the writing determination unit 12 discards the writing request. Furthermore, the request placement unit 13 deletes the editing data stream received together with the writing request from the storage unit 6.

There is a case in which the moving image editing apparatus 2 receives, from the same user terminal as the user terminal that transmitted the reading request that has already been stored, a reading request used to read the same range as the range specified by the reading request that has already been stored in the stack memory 14. In this case, the request placement unit 13 may delete the duplicate reading request that has been stored earlier, and register the newly received reading request in the stack memory 14. Furthermore, there is a case in which the moving image editing apparatus 2 receives a writing request targeting the same range as the range specified by the writing request that has already been stored in the stack memory 14 from the same user terminal as the user terminal that transmitted the writing request that has been stored earlier. In this case, the request placement unit 13 may delete the duplicate writing request that has been stored earlier, and register the newly received writing request in the stack memory 14. Furthermore, the request placement unit 13 deletes, from the storage unit 6, the editing data stream received together with the deleted writing request.

Furthermore, there is a case in which the moving image editing apparatus 2 receives, from the same user terminal as the user terminal that transmitted the editing request that has been stored earlier, an editing request targeting the same range as the range specified by the editing request that has already been stored in the stack memory 14. In this case, regardless of whether or not the reading request included in the editing request that has been stored earlier has been executed, the request placement unit 13 may delete the duplicate editing request that has been stored earlier, and register the newly received editing request in the stack memory 14.

Furthermore, when the request placement unit 13 receives a writing completion request from one of the user terminals 3-1 to 3-3, the request placement unit 13 notifies the request processing unit 17 of the information included in the writing completion request.

Furthermore, when the request placement unit 13 receives a cancellation request from one of the user terminals 3-1 to 3-3, the request placement unit 13 deletes, from the stack memory 14, a request corresponding to the identification number of the request to be cancelled, which is included in the cancellation request. In that case, if the request to be cancelled is an editing request, both the reading request and the writing request contained in the editing request are deleted.

However, when the request corresponding to the identification number of the request to be cancelled does not exist in the stack memory 14, the request placement unit 13 discards the cancellation request itself.

The stack memory 14 may store the requests received from the request placement unit 13 in the order of registration time. Then, the stack memory 14 sequentially passes the requests in the order of the earliness of the registered request to the request processing unit 17. For this purpose, the stack memory 14 includes, for example, an first-in first-out (FIFO) type memory circuit. Alternatively, the stack memory 14 may be formed to have the same function as that of an FIFO type memory circuit in a pseudo-manner by using a memory circuit of the control unit 7.

The stack memory 14 deletes the request read by the request processing unit 17.

Figure 4:
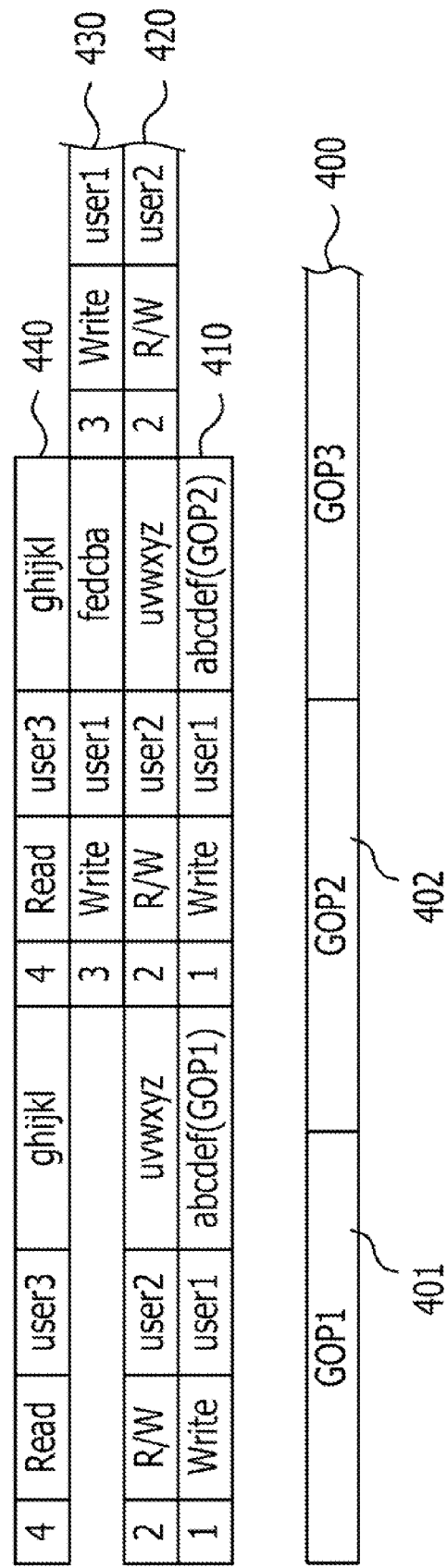
FIG. 4 illustrates an example of requests stored in one of stack memories.

FIG. 4 is a conceptual view illustrating an example of requests stored in the stack memory 14. In FIG. 4, a block 400 represents a data stream of a moving image, and subblocks 401 and 402 included in the block 400 each represent a GOP. Blocks 410 to 440 each represent a stacked request. The newer the request among the blocks 410 to 440, the closer to the upper side the request is placed. In a subblock at the left end of each block, the identification number of a request is recorded. In a second subblock from the left of each block, the type of the request is recorded. For example, in the subblock in which the type of the request is recorded, a reading request is denoted as "Read", a writing request as "Write", and an editing request as "Read/Write". In the third subblock from the left of each block, the identification number of the user terminal that transmitted the request is recorded. For example, in the subblock in which the identification number of the user terminal is recorded, the identification numbers of the user terminals 3-1 to 3-3 are denoted as "user1", "user2", and "user3", respectively. Furthermore, in the subblock at the right end, an address of the place in which the GOP of the data stream to be processed is stored is recorded. In the subblock at the right end, the name or the identification number of the data stream to be processed may be recorded.

As shown in FIG. 4, in the stack memory 14, each request is stored for each GOP serving as a target for the request. For example, in the block 410, since the request is targeted for GOP1 and GOP2, it is shown that two requests are registered. It is also shown that the identification number of the request is 1, and the type of the request is a writing request. Furthermore, it is shown in the block 410 that the user terminal 3-1 has transmitted this request, and at the address "abcdef" of the storage unit 6, editing data streams (GOP1 and GOP2) corresponding to this writing request have been stored.

Figure 5:
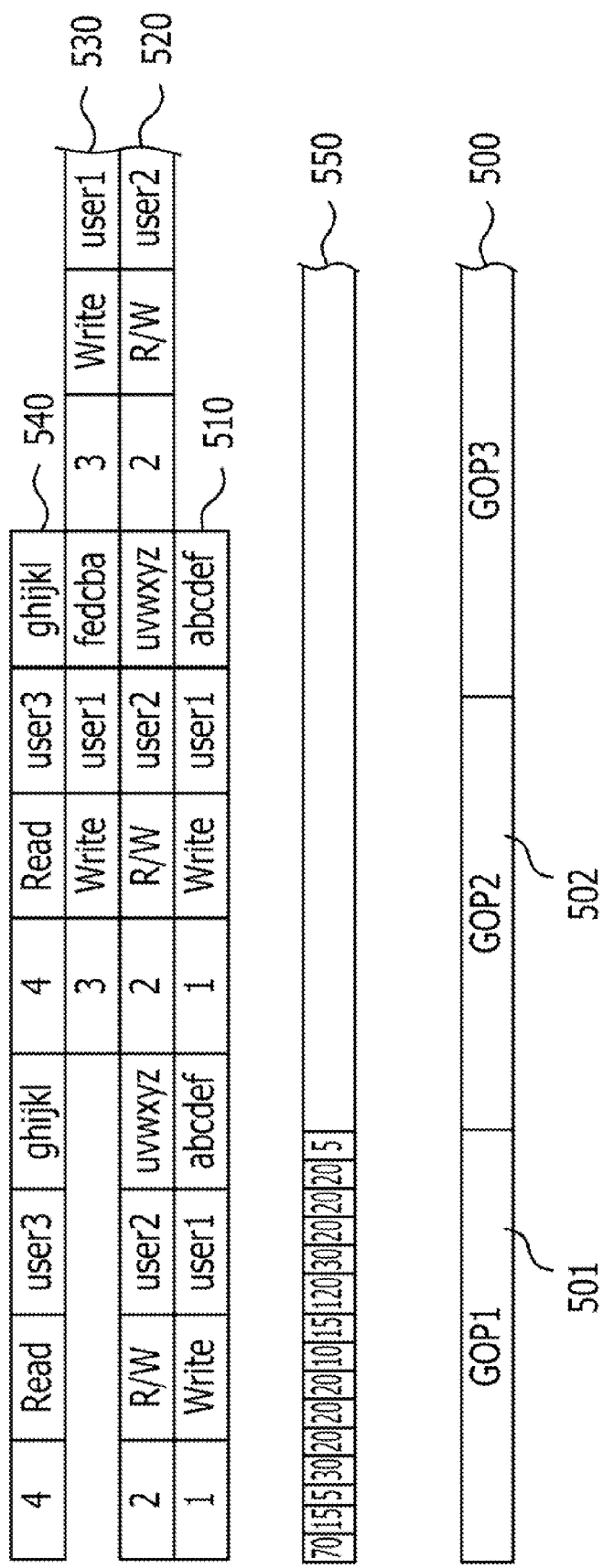
FIG. 5 illustrates another example of requests stored in one of the stack memories.

FIG. 5 is a conceptual view illustrating another example of requests stored in the stack memory 14. In FIG. 5, a block 500 represents a data stream of a moving image, and subblocks 501 and 502 included in the block 500 each represent a GOP. Blocks 510 to 540 each represent a stacked request. The structure and the content of each subblock included in each of the blocks 510 to 540 are the same as those of each of the blocks 410 to 440 shown in FIG. 4. Furthermore, in FIG. 5, as shown in a block sequence 550, in the stack memory 14, the amount of information of each picture included in each GOP is stored in the order of time of each picture.

In this case, the writing determination unit 12 determines whether or not the editing data stream can be used by using the amount of information of each picture. More specifically, the amount of information of each picture included in the range to be replaced with the editing data stream, is obtained from the stack memory 14, and it is determined whether or not the editing data stream can be used.

Figure 6:
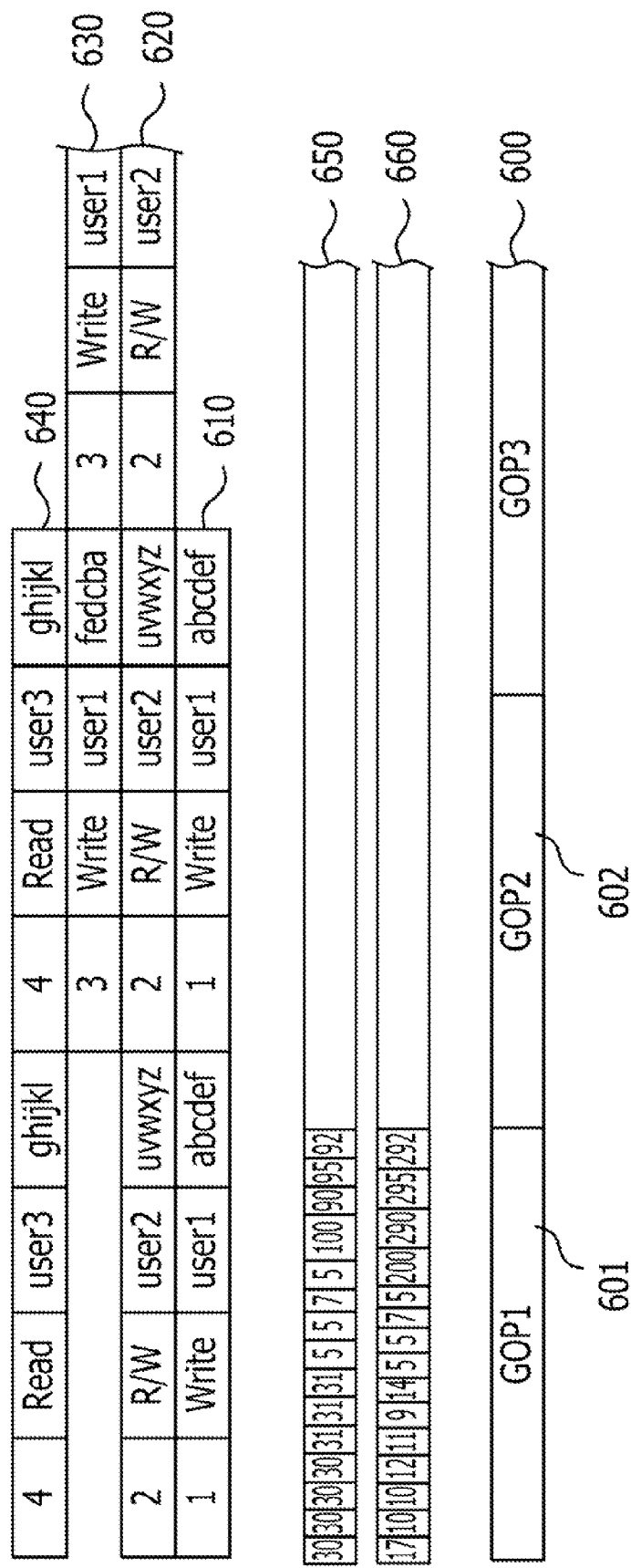
FIG. 6 illustrates still another example of requests stored in one of the stack memories.

FIG. 6 is a conceptual view illustrating still another example of requests stored in the stack memory 14. In FIG. 6, a block 600 represents a data stream of a moving image, and subblocks 601 and 602 included in the block 600 each represent a GOP. Blocks 610 to 640 each represent a stacked request. The structure and the content of each subblock included in the blocks 610 to 640 are the same as those of the blocks 410 to 440 shown in FIG. 4. Furthermore, in FIG. 6, as shown in a block sequence 650, the stack memory 14 is stored with an averaged quantization parameter of each picture included in each GOP in the order of time of each picture. Furthermore, as shown in a block sequence 660, the stack memory 14 is stored with the differential absolute value sum of each color value between corresponding pixels of two pictures that are consecutive with respect to time in the order of the reception time of each picture.

In this case, also, the writing determination unit 12 determines whether or not the editing data stream can be used by using the averaged quantization parameter of each picture or the differential absolute value sum of each color value between corresponding pixels. More specifically, an averaged quantization parameter of each picture included in the range to be replaced with the editing data stream, or the differential absolute value sum of each color value between corresponding pixels is obtained from the stack memory 14, and it is determined whether or not the editing data stream can be used.

When the updating unit 15 receives the instruction of executing a writing completion request, the updating unit 15 replaces each picture included in the range of the data stream specified by the writing request with the editing data stream received together with the writing request recorded in the storage unit 6.

At that time, the updating unit 15 submits an inquiry to the writing determination unit 12 regarding whether or not the editing data stream received together with the writing request corresponding to the writing completion request can be used to replace the data stream of the specified moving image. Then, when the determination result that the editing data stream can be used is received from the writing determination unit 12, the updating unit 15 replaces each picture in the range specified by the writing request within the data stream of the specified moving image with each picture included in the editing data stream. While the updating unit 15 is performing the replacement of the data stream of the moving image, the updating unit 15 stops the execution of the request from another user terminal with respect to the data stream of the moving image to be replaced. Furthermore, after the replacement is completed, the updating unit 15 deletes the editing data stream used for the replacement from the storage unit 6.

On the other hand, when the determination result that the editing data stream should not or cannot be used is received from the writing determination unit 12, the updating unit 15 does not execute the writing completion request. Then, the updating unit 15 discards the writing completion request. Furthermore, the updating unit 15 deletes, from the storage unit 6, the editing data stream received together with the writing request corresponding to the writing completion request.

When the sending processing unit 16 is instructed to execute the reading request from the request processing unit 17, the sending processing unit 16 transmits the range in which the data stream of the moving image is specified, which is specified by the reading request, to the user terminal that transmitted the reading request.

Here, when there is image continuity between two pictures with the boundary of the specified range therebetween, preferably, the sending processing unit 16 extends the range of the data stream to be sent to the user terminal up to the position at which a scene closest to the specified range changes. In particular, when the reading request is included in the editing request, each picture included in the range that is read by the reading request is replaced with the editing data stream received together with the writing request corresponding to the reading request. That is, by extending the range of the data stream to be sent, it is possible to create an editing data stream in which each picture included in the received range is edited without considering image continuity by the user. Then, the writing determination unit 12 does not need to check the image continuity with regard to the created editing data stream.

With regard to the determination of whether or not there is image continuity, the sending processing unit 16 performs a process similar to image continuity determination performed by the writing determination unit 12.

There is a case in which the moving image editing apparatus 2 receives, from one of the user terminals, a writing request or an editing request that targets a range overlapping at least a portion of the range specified by the reading request that has already been stored in the stack memory 14. In this case, by referring to the stack memory 14, the sending processing unit 16 may perform a correction so that the range to be read by the reading request that has been stored earlier includes the entire range targeted by the writing request or the editing request received at a later time.

Furthermore, the sending processing unit 16 replaces, with the editing data stream received together with the writing request or the editing request, a portion that overlaps the range specified by the writing request or the editing request executed at a later time within the range specified by the reading request.

There is a case in which a plurality of editing data streams with which at least a portion of the specified range is to be replaced are stored in the storage unit 6. In this case, the sending processing unit 16 replaces, for each GOP or for each picture, for example, the GOP or the picture to which the data stream specified by the GOP or the picture included in the newest editing data stream corresponds.

Figures 7A, 7B, 7C:
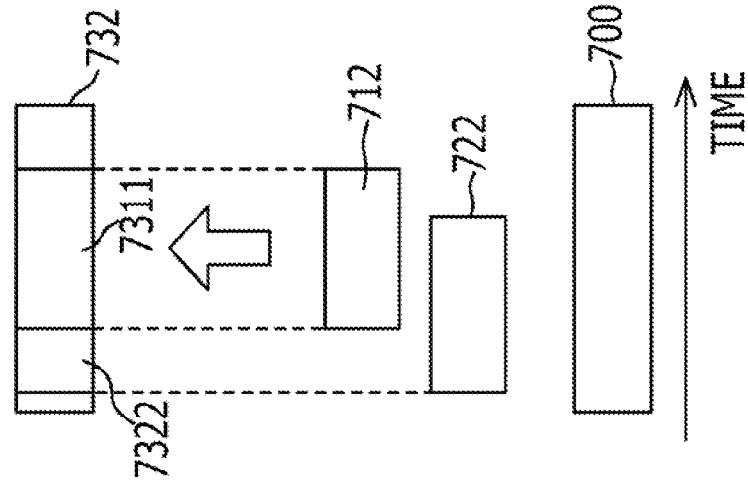
FIGS. 7A, 7B, and 7C each illustrate a correspondence of items of a data stream in a case where a portion of the original data stream is replaced with a plurality of editing data streams.

FIGS. 7A to 7C each illustrate a correspondence of data streams in a case where a portion of the range of a data stream specified by the reading request is replaced with a plurality of editing data streams. FIG. 7A illustrates a case in which a range to be replaced with an immediately previous editing data stream received by the moving image editing apparatus 2 is included in a range to be replaced with an up-to-date editing data stream. FIG. 7B illustrates a case in which a range to be replaced with an up-to-date editing data stream is included in a range to be replaced with an immediately previous editing data stream received by the moving image editing apparatus 2. FIG. 7C illustrates a case in which a range to be replaced with an up-to-date editing data stream, and a range to be replaced with an immediately previous editing data stream received by the moving image editing apparatus 2 partially overlap each other.

In FIGS. 7A to 7C, the horizontal axis represents time. A block 700 represents a data stream of a specified moving image. Blocks 710 to 712 each represent an up-to-date editing data stream. Blocks 720 to 722 each represent an immediately previous editing data stream. Furthermore, blocks 730 to 732 each represent a data stream to be sent to a user terminal.

In FIG. 7A, a range for which the immediately previous editing data stream 720 received by the moving image editing apparatus 2 is to be replaced is included in a range for which the up-to-date editing data stream 710 is to be replaced. For this reason, in the data stream 730 to be sent, a range 7301 overlapping the up-to-date editing data stream 710 within the specified data stream 700 is replaced with the up-to-date editing data stream 710.

On the other hand, in FIG. 7B, the range for which the up-to-date editing data stream 711 is to be replaced is included in the range for which the immediately previous editing data stream 721 received by the moving image editing apparatus 2 is to be replaced. For this reason, in the data stream 731 to be sent, a range 7311 overlapping the up-to-date editing stream 711 within the specified data stream 700 is replaced with the up-to-date editing data stream 711. Furthermore, within the specified data stream 700, a range 7312 that overlaps the immediately previous editing data stream 721 and that does not overlap the up-to-date editing data stream 711 is replaced with the immediately previous editing data stream 721.

In FIG. 7C, a range for which the up-to-date editing data stream 712 is to be replaced partially overlaps the range for which the immediately previous editing data stream 722 received by the moving image editing apparatus 2 is to be replaced. For this reason, in the data stream 732 to be sent, a range 7321 overlapping the up-to-date editing stream 712 within the specified data stream 700 is replaced with the up-to-date editing data stream 712. Furthermore, a range 7322 that overlaps the immediately previous editing data stream 722 and that does not overlap the up-to-date editing data stream 712 within the specified data stream 700 is replaced with the immediately previous editing data stream 722.

The sending processing unit 16 transmits the data stream created in the manner described above to the user terminal that transmitted the reading request. As a result, it is possible for the sending processing unit 16 to reflect the editing data stream that has already been received for both the writing request and the editing request to be executed later when transmitting a data stream to the user terminal. Then, even while a plurality of users are editing one moving image, it is possible for the user terminals to obtain a data stream of an up-to-date moving image.

The request processing unit 17 reads a request stored in the stack memory 14 in the order of registration time. Then, if the read request is a reading request, the request processing unit 17 causes the sending processing unit 16 to perform a process for sending the data stream in accordance with the content of the request. Furthermore, if the read request is a writing request, the request processing unit 17 notifies the user terminal that transmitted the writing request of the fact that a writing preparation has become ready. Then, when the request processing unit 17 receives a writing completion request from the user terminal, the request processing unit 17 causes the updating unit 15 to perform a process for updating the data stream of the moving image in accordance with the writing completion request and the content of the corresponding writing request.

There is a case in which, in the writing completion request, it is specified that a range narrower than the replacement target range specified by the corresponding writing request is replaced. In this case, the request processing unit 17 notifies the updating unit 15 that only the range specified by the writing completion request is to be replaced, for example. Furthermore, the request processing unit 17 may delete only the writing request corresponding to the range specified by the writing completion request from the stack memory 14, for example.

Furthermore, if the read request is an editing request, the request processing unit 17 causes the sending processing unit 16 to perform a process for sending the data stream in accordance with the content of the reading request included in the editing request. Thereafter, the request processing unit 17 waits until an editing data stream is received from the user terminal that transmitted the editing request that is currently being processed. Then, when the request processing unit 17 receives the editing data stream, the request processing unit 17 notifies the user terminal that transmitted the editing request of the fact that a writing preparation has become ready. Thereafter, when the request processing unit 17 receives the writing completion request from the user terminal, the request processing unit 17 causes the updating unit 15 to perform a process for updating the moving image in accordance with the writing completion request and the content of the writing request included in the corresponding editing request.

Figure 8:
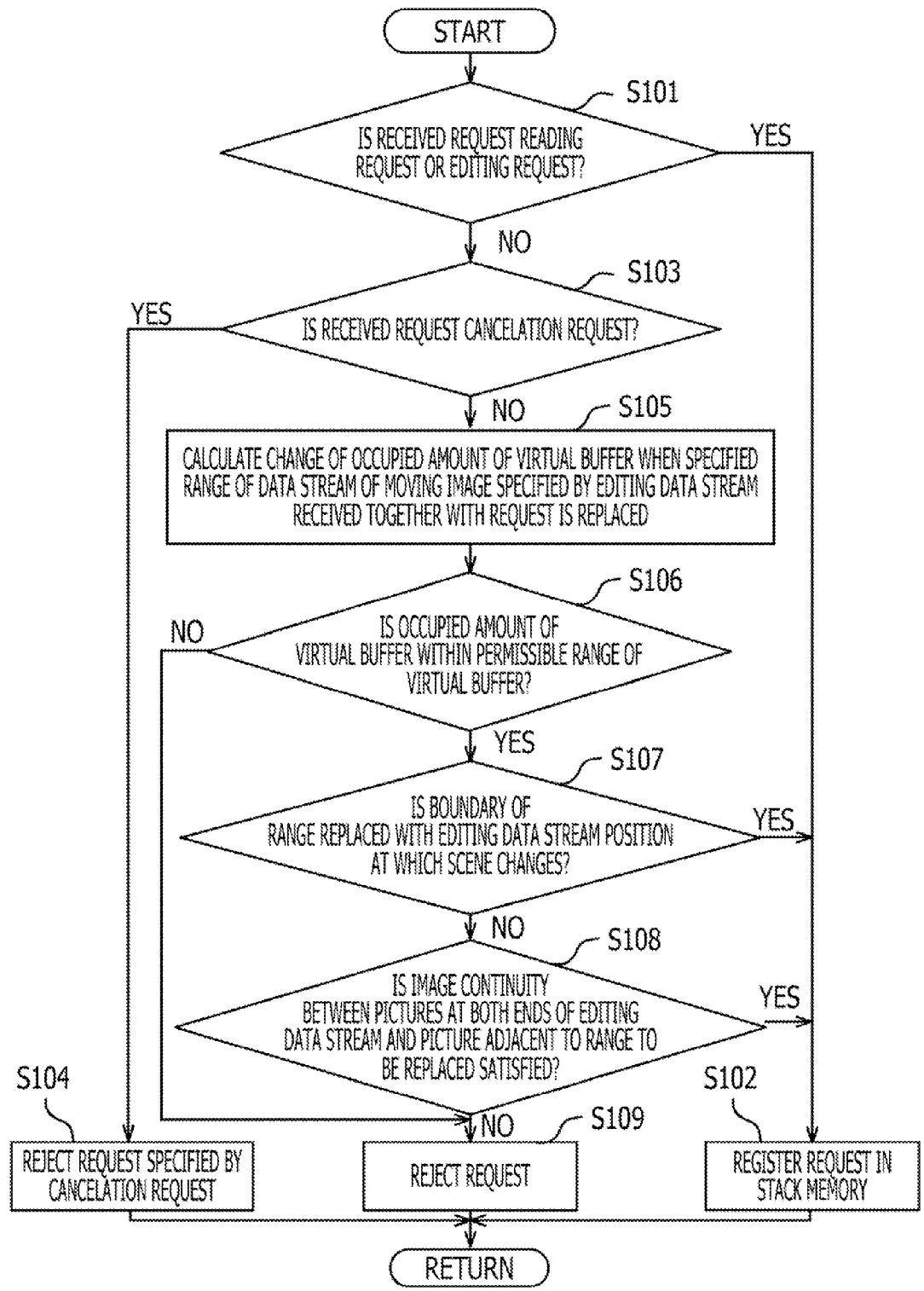
FIG. 8 is an operation flowchart of a request receiving process.

FIG. 8 is an operation flowchart of a request receiving process when the moving image editing apparatus 2 receives a request from one of the user terminals 3-1 to 3-3. This operation flow may be controlled in accordance with a program stored in a memory and executed by a processor of the control unit 7, for example.

The request placement unit 13 determines whether or not the received request is a reading request or an editing request (S101). If the received request is a reading request or an editing request (Yes in S101), the request placement unit 13 registers the request in the stack memory (S102).

On the other hand, if the received request is neither a reading request nor an editing request (No in S101), the request placement unit 13 determines whether or not the received request is a cancellation request (S103). If the received request is a cancellation request (Yes in S103), the request placement unit 13 discards the request specified by the cancellation request (S104).

On the other hand, when the received request is not a cancellation request (No in S103), if the received request is a writing request, the writing determination unit 12 determines whether or not the editing data stream received together with the request can be used. More specifically, the writing determination unit 12 calculates the change in the occupied amount of the virtual buffer when the specified range of the data stream of the moving image specified by the editing data stream is replaced (S105). Then, the writing determination unit 12 determines whether or not the occupied amount of the virtual buffer is within the permissible range of the virtual buffer defined in accordance with the VBV definition with regard to each picture of the replaced data stream (S106).

With regard to any one of pictures, when the occupied amount of the virtual buffer is not within the permissible range of the virtual buffer (No in S106), the VBV definition is not satisfied. Therefore, the writing determination unit 12 determines that the editing data stream should not or cannot be used to replace the data stream of the moving image specified by the request. Then, the writing determination unit 12 notifies the request placement unit 13 of the determination result. The request placement unit 13 discards the received request (S109). Furthermore, the request placement unit 13 deletes the editing data stream received from the storage unit 6.

On the other hand, with regard to all the pictures, when the occupied amount of the virtual buffer is within the permissible range of the virtual buffer (Yes in S106), the VBV definition is satisfied. Therefore, the writing determination unit 12 determines whether or not the boundary of the range replaced by the editing data stream is a position at which a scene changes (S107).

If the boundary of the range replaced by the editing data stream corresponds to a position at which a scene changes (Yes in S107), the writing determination unit 12 determines that the editing data stream can be used to replace the data stream of the moving image specified by the request. Then, the writing determination unit 12 notifies the request placement unit 13 of the determination result. The request placement unit 13 registers the request in the stack memory 14 (S102).

On the other hand, if the boundary of the range replaced by the editing data stream does not correspond to a position at which a scene changes (No in S107), the writing determination unit 12 checks image continuity in the data stream replaced by the editing data stream. More specifically, the writing determination unit 12 determines whether or not the image continuity between the pictures at both ends of the editing data stream and the picture adjacent to the range replaced by the editing data stream within the specified data stream is satisfied (S108).

When the image continuity is satisfied (Yes in S108), the writing determination unit 12 determines that the editing data stream can be used to replace the data stream of the moving image specified by the request. Then, the writing determination unit 12 notifies the request placement unit 13 of the determination result. The request placement unit 13 registers the request in the stack memory 14 (S102).

On the other hand, if the image continuity is not satisfied (No in S108), the writing determination unit 12 determines that the editing data stream should not or cannot be used to replace the data stream of the moving image specified by the request. Then, the writing determination unit 12 notifies the request placement unit 13 of the determination result. The request placement unit 13 discards the request (S109). Furthermore, the request placement unit 13 deletes the editing data stream received from the storage unit 6.

After S102, S104, or S109, the control unit 7 completes the request receiving process.

One of S106, S107, and S108 may be omitted. Furthermore, the execution order of S106, S107, and S108 may be changed.

Figure 9:
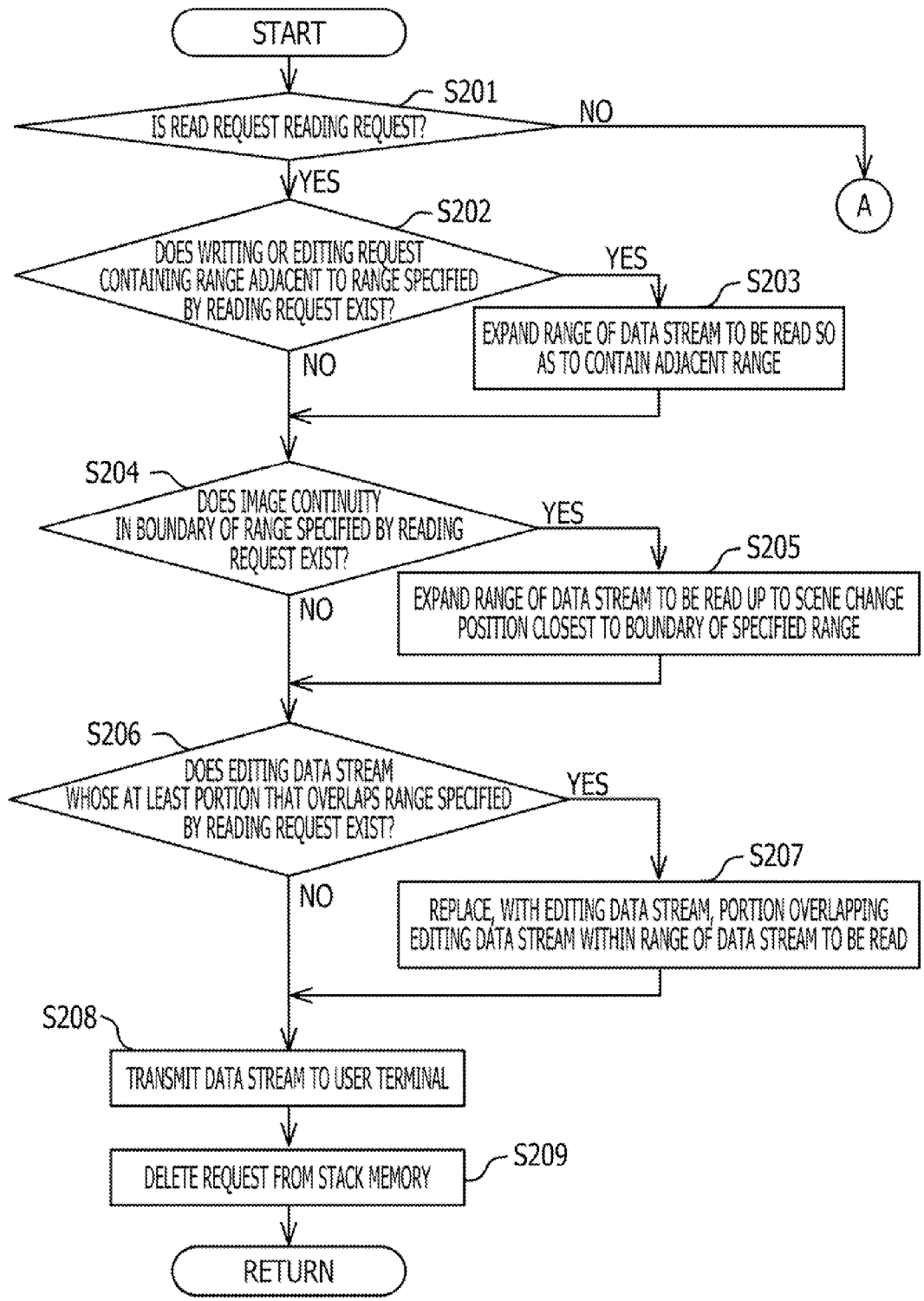
FIG. 9 is an operation flowchart of a request execution process.
Figure 10:
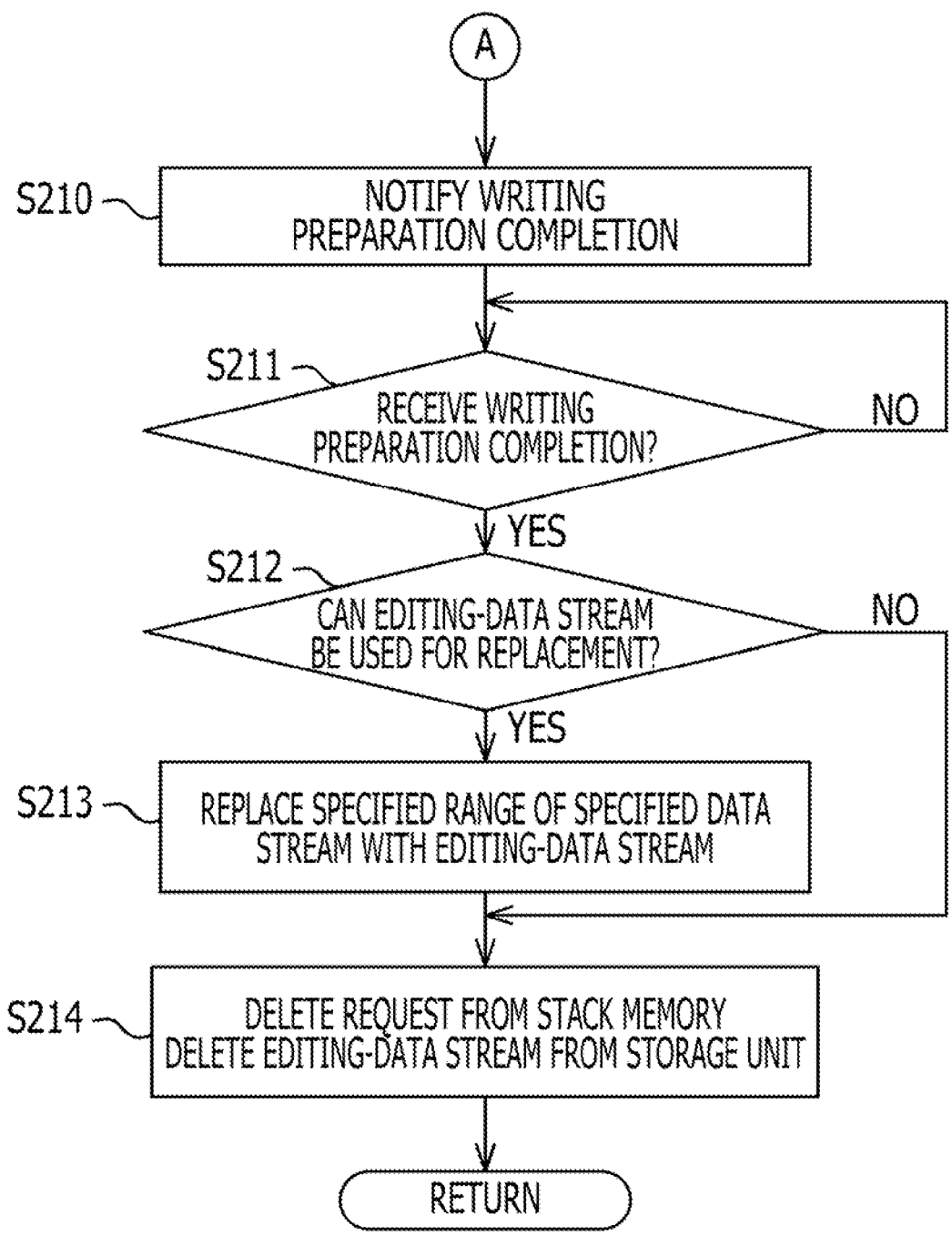
FIG. 10 is an operation flowchart of a request execution process.

FIGS. 9 and 10 are operation flowcharts of a request execution process performed when the request processing unit 17 reads a request from the stack memory 14. These operation flowcharts are controlled in accordance with a program stored in a memory and executed by a processor of the control unit 7, for example. Furthermore, these operation flowcharts are performed each time a request is read from the stack memory 14.

The request processing unit 17 determines whether or not the read request is a reading request (S201). If the read request is a reading request (Yes in S201), the request processing unit 17 notifies the sending processing unit 16 of the content of the reading request. The sending processing unit 16 determines whether or not a writing request or an editing request including a range adjacent to the range specified by the reading request has been registered (S202).

When a writing request or an editing request including a range adjacent to the specified range has been registered (Yes in S202), the sending processing unit 16 expands the range of the data stream to be read so as to include the adjacent range (S203).

When a request including the range adjacent to the specified range has not been registered (No in S202) or after S203, the sending processing unit 16 determines whether or not there is image continuity in the boundary of the specified range (S204). When there is image continuity in the boundary of the specified range (Yes in S204), the sending processing unit 16 extends the range to be sent to a position at which a scene changes, which is closest to the boundary of the specified range (S205).

When there is no image continuity in the boundary of the specified range (No in S204), the sending processing unit 16 determines whether or not at least a portion of the editing data stream overlapping the range specified by the reading request has been stored in the storage unit 6 (S206). Furthermore, after S205, the sending processing unit 16 performs the process of S206.

When at least a portion of the editing data stream overlapping the range specified by the reading request has been stored in the storage unit 6 (Yes in S206), the sending processing unit 16 replaces the portion overlapping the editing data stream within the range of the data stream to be read with the editing data stream (S207).

When at least a portion of the editing data stream overlapping the range specified by the reading request has not been stored in the storage unit 6 (No in S206), or after S207, the sending processing unit 16 transmits the data stream to the user terminal (S208). Furthermore, the request processing unit 17 deletes the read request from the stack memory 14 (S209). After that, the control unit 7 completes the request execution process.

When it is determined in S201 that the read request is a writing request (No in S201), the request processing unit 17 notifies the updating unit 15 of the content of the writing request. Then, the updating unit 15 notifies the user terminal that transmitted the writing request of the completion of writing preparation (S210).

After that, the updating unit 15 determines whether or not a writing completion request has been received (S211). If the writing completion request has not been received, the updating unit 15 repeats the process of S211.

On the other hand, if the writing completion request has been received, the updating unit 15 causes the writing determination unit 12 to determine whether or not the editing data stream can be used for replacement (S212). This determination may be identical to the processing of S106 to S108 shown in FIG. 8, for example.

If the updating unit 15 receives a determination result that the editing data stream can be used for replacement from the writing determination unit 12 (Yes in S212), the updating unit 15 replaces the specified range of the specified data stream with the editing data stream (S213). Then, the updating unit 15 notifies all the user terminals connected to the moving image editing apparatus 2 or all the user terminals in which an editing program is running, of the fact that the data stream of the moving image has been updated.

After S213, the updating unit 15 deletes the editing data stream from the storage unit 6. Furthermore, the request processing unit 17 deletes the request from the stack memory 14 (S214).

On the other hand, when the updating unit 15 receives a determination result that the editing data stream should not or cannot be used for replacement from the writing determination unit 12 (No in S212), the updating unit 15 does not update the specified moving image data, and deletes the editing data stream from the storage unit 6. Furthermore, the request processing unit 17 deletes the request from the stack memory 14 (S214).

After S214, the control unit 7 completes the request execution process.

When the request read from the stack memory 14 is an editing request, the control unit 7 performs the processing regarding the reading request included in the editing request by performing the processing of S202 to S208. After that, when the control unit 7 receives the editing data stream from the user terminal that transmitted the editing request, the control unit 7 performs the processing of S210 to S214.

As has been described above, when the moving image editing apparatus sends a data stream of a moving image in a range specified by the reading request to a user terminal, the moving image editing apparatus confirms whether or not an editing data stream with which at least a portion of the specified range is to be replaced has been received. Then, if the editing data stream exists, the moving image editing apparatus sends a moving image created by replacing the data stream specified by the editing data stream, thereby making it possible for a plurality of users to share up-to-date corrected content. Furthermore, the moving image editing apparatus registers requests that are individually received from the plurality of user terminals in the stack memory in the received order, and reads those requests in sequence and executes them, thereby making it possible for the plurality of users to edit one moving image in parallel. In that case, only while the data stream of the moving image is actually being replaced with the editing data stream received from one user terminal, this moving image editing apparatus causes the other user terminals not to edit the data stream. As a result, this moving image editing apparatus makes it possible to shorten the waiting time of the users of the other user terminals.

Furthermore, the moving image editing apparatus permits a moving image to be updated when image continuity is maintained at other than a position at which a scene changes or the VBV definition is satisfied between an editing data stream and a portion adjacent to a range replaced by the editing data stream. This makes it possible for the moving image editing apparatus to maintain compatibility of a moving image after editing.

According to another embodiment, when a request read from a stack memory is a writing request, the request processing unit does not wait for the reception of a writing completion request and may cause the updating unit to substantially immediately execute the writing request.

Furthermore, when the moving image editing apparatus has received a plurality of different moving images stored in the storage unit or a plurality of requests with respect to different ranges within the same moving image, the moving image editing apparatus may simultaneously execute the plurality of these requests.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

The invention claimed is:

1. A moving image editing apparatus coupled to a plurality of user terminals, the moving image editing apparatus comprising:
a storage configured to store a first moving image;
a memory configured to store requests including a reading request of a first user terminal requesting reading of at least a portion of the first moving image from the storage, and a writing request of a second user terminal requesting replacement of at least a part of the portion of the first moving image with a second moving image differing from the first moving image, the writing request caused as a result of editing in the second user terminal the part of the first moving image, which has been read from the storage before the reading request from the first user terminal is stored, using the second moving image; and
a processor configured to:
execute the requests in order of reception time of the requests;
output, when a specified portion specified by the reading request of the first user terminal overlaps the second moving image to be used in the replacement by the writing request after an execution of the reading request, to the first user terminal which requests the reading request the specified portion in which an overlapping portion with regard to the second moving image has been replaced based on the second moving image.

2. The moving image editing apparatus according to claim 1, wherein the processor is further configured to determine whether the second moving image can be used to replace the specified portion of the first moving image.

3. The moving image editing apparatus according to claim 2, wherein, when a data stream in which a third moving image in which the specified portion of the first moving image has been replaced with the second moving image is coded is transferred to a virtual decoder at a transfer rate and is stored in a buffer of the decoder, and data corresponding to each picture included in the third moving image is sequentially extracted from the buffer at time intervals, the processor is further configured to determine that, when an occupied amount that the third moving image occupies in the buffer is within a permissible range of the buffer, the second moving image can be used to replace the specified portion of the first moving image.

4. The moving image editing apparatus according to claim 2, wherein the processor is further configured to determine that, when image continuity between a picture at an end portion of the second moving image and a picture adjacent to the picture at the end portion when the specified portion of the first moving image has been replaced with the second moving image is satisfied, the second moving image can be used to replace the specified portion of the first moving image.

5. The moving image editing apparatus according to claim 2, wherein the processor is further configured to determine that when, in the first moving image, a boundary of the range to be replaced with the second moving image corresponds to a position at which a scene changes, the second moving image can be used to replace the specified portion of the first moving image.

6. The moving image editing apparatus according to claim 1, wherein when image continuity is satisfied with regard to two pictures with a boundary of a reading range therebetween, the processor is further configured to expand the reading range so as to include at least one picture adjacent to an external side of the boundary.

7. The moving image editing apparatus according to claim 1, wherein, when the second moving image that overlaps the specified portion and which includes a picture adjacent to the part of the portion to be replaced has been received, the processor is further configured to expand the specified portion to include the picture to be replaced with the second moving image.

8. The moving image editing apparatus according to claim 1, wherein the processor is further configured to replace, when the writing request is read from the memory, the specified portion of the first moving image with the second moving image corresponding to the writing request.

9. A moving image editing method of an image editing apparatus coupled to a plurality of user terminals, the moving image editing method comprising:
storing a reading request of a first user terminal requesting reading of at least a portion of the first moving image from a storage, and a writing request of a second user terminal requesting replacement of at least a part of the portion of the first moving image with a second moving image differing from the first moving image, the writing request caused as a result of editing in the second user terminal the part of the first moving image, which has been read from the storage before the reading request from the first user terminal is stored, using the second moving image;

executing the requests in order of reception time of the requests; and outputting, when a specified portion specified by the reading request of the first user terminal overlaps the second moving image to be used in the replacement by the writing request after an execution of the reading request, to the first user terminal which requests the reading request the specified portion in which an overlapping portion with regard to the second moving image has been replaced based on the second moving image.

10. A non-transitory computer-readable storage medium storing a program, which when executed by a processor, causes the processor that is coupled to a plurality of user terminals to perform a moving image editing method comprising:

storing a reading request of a first user terminal requesting reading of at least a portion of the first moving image from a storage, and a writing request of a second user terminal requesting replacement of at least a part of the portion of the first moving image with a second moving image differing from the first moving image, the writing request caused as a result of editing in the second user terminal the part of the first moving image, which has been read from the storage before the reading request from the first user terminal is stored, using the second moving image;

executing the requests in order of reception time of the requests; and outputting, when a specified portion specified by the reading request of the first user terminal overlaps the second moving image to be used in the replacement by the writing request after an execution of the reading request, to the first user terminal which requests the reading request, the specified portion in which an overlapping portion with regard to the second moving image has been replaced based on the second moving image.

11. The moving image editing method according to claim 9, further comprising determining whether the second moving image can be used to replace the specified portion of the first moving image.

12. The moving image editing method according to claim 11, wherein, when a data stream in which a third moving image in which the specified portion of the first moving image has been replaced with the second moving image is coded is transferred to a virtual decoder at a transfer rate and is stored in a buffer of the decoder, and data corresponding to each picture included in the third moving image is sequentially extracted from the buffer at time intervals, the method further comprises determining that, when an occupied amount that the third moving image occupies in the buffer is within a permissible range of the buffer, the second moving image can be used to replace the specified portion of the first moving image.

13. The moving image editing method according to claim 11, further comprising determining that, when image continuity between a picture at an end portion of the second moving image and a picture adjacent to the picture at the end portion when the specified portion of the first moving image has been replaced with the second moving image is satisfied, the second moving image can be used to replace the specified portion of the first moving image.

14. The moving image editing method according to claim 11, further comprising determining that when, in the first moving image, a boundary of the range to be replaced with the second moving image corresponds to a position at which a scene changes, the second moving image can be used to replace a range of at least a portion of the first moving image.

15. The moving image editing method according to claim 9, wherein when image continuity is satisfied with regard to two pictures with a boundary of a reading range therebetween, the method further comprises expanding the reading range so as to include at least one picture adjacent to an external side of the boundary.

16. The moving image editing method according to claim 9, wherein, when the second moving image that overlaps the specified portion and which includes a picture adjacent to the part of the portion to be replaced has been received, the method further comprises expanding the specified portion to include the picture to be replaced with the second moving image.

17. The moving image editing apparatus according to claim 9, further comprising replacing, when the writing request is read from a memory, the specified portion of the first moving image with the second moving image corresponding to the writing request.

* * * * *